Charles L. Wheeler.
No. 120,556.  Patented Oct. 31, 1871.
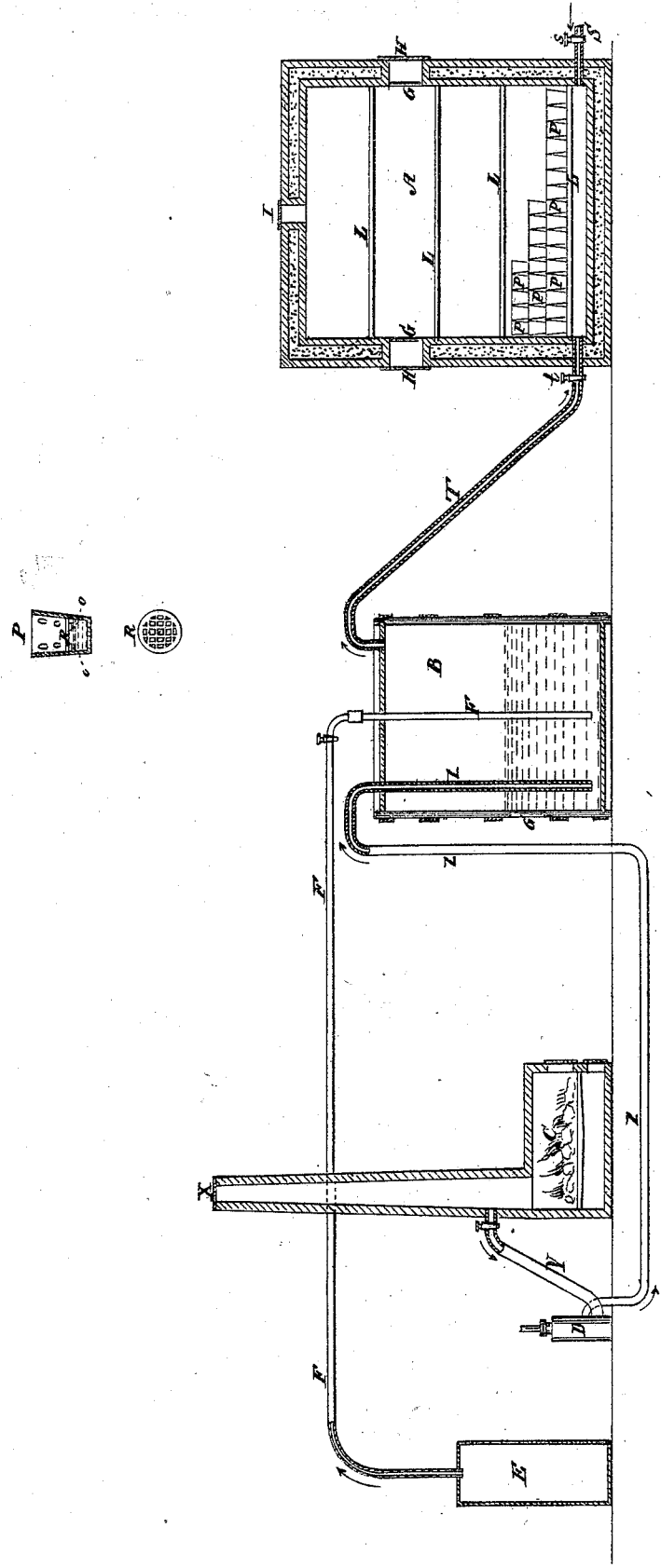

UNITED STATES PATENT OFFICE.

CHARLES L. WHEELER, OF PITTSBURG, PENNSYLVANIA.

IMPROVEMENT IN PROCESSES OF MAKING WHITE LEAD.

Specification forming part of Letters Patent No. 120,556, dated October 31, 1871.

*To all whom it may concern:*

Be it known that I, CHARLES L. WHEELER, of Pittsburg, in the county of Allegheny and in the State of Pennsylvania, have invented a new and useful Process for Making White Lead; and I do hereby declare that the following is a full, clear, and exact description thereof, reference being had to the accompanying drawing forming a part of this specification.

My invention is a new and useful process for converting metallic lead into carbonate of lead, or what is commercially known as "white lead;" and consists in placing in a corroding-chamber or "stack" (without tan or manure) several perforated shelves, upon which are put a large number of small earthen pots containing acetic acid and "buckles" of metallic lead, Into this corroding-chamber is then introduced a sufficient quantity of live steam to bring up its temperature, as indicated, to about 100° Fahrenheit. The steam is then cut off. After this, then, in a suitable furnace, by consumption of coke or otherwise, I manufacture carbonic-acid gas. This gas is drawn from the furnace chimney into and discharged near the bottom of a washing-vessel half filled with water, which vessel and water is heated by steam from a boiler up to about 100° Fahrenheit. The carbonic-acid gas, thoroughly purified in the "washer," and heated up to the desired temperature, then flows into the corroder at the bottom and converts the acetate of lead (made by the action of fumes of acetic acid upon metallic lead) into carbonate of lead.

The drawing represents a vertical section of an apparatus in which I have successfully used my process; but it is obvious that the said process may be used in "corroders," "washers," "boilers," or "acid-makers," of various styles of construction.

I shall describe the apparatus shown in the drawing, and fully explain the process which I have invented. Different manufacturers will vary the sizes, proportions, and, in some degree, arrangement of the several things used in my process.

In the drawing, A represents one of the stacks or corroders which I prefer to use in my process. This stack is about twelve feet in each dimension, made of one-inch flooring-boards, the surrounding wall being of similar construction, and leaving a space of about six inches to be packed with sawdust or other non-conductor; but these stacks may be made of other materials, or the stacks now in use in the so-called Dutch method may be modified so as to answer for my process. At the bottom of this stack is a steam-pipe, S, for the admission of live steam to properly heat the stack and incidentally oxidize the lead. Also, at the bottom, but on the other side, is an earthen pipe, T, and stop-cock $t$, for the admission of the purified and properly-heated carbonic-acid gas. H H indicate two or more doors for examining the thermometers G or the condition of the interior of the stack. I indicates a ventilator on top of the stack. L L represent a series of strong movable perforated shelves inside of the stack, for supporting the earthen pots which contain the acetic acid and the buckles. Ordinarily I use the "pots," "acid," and buckles of about the size, strength, and proportions required by the common or Dutch process. These earthen pots P, perforated near the top, may be about nine inches high and seven inches wide, externally, and slightly conical, and are capable of containing about a quart of acetic acid (about the strength of table vinegar) below the projections $o\,o\,o$, which sustain the buckles R. These buckles may be made of metallic lead in the usual mode, (or otherwise,) being cast into the form of a circular disk with a rim and perforations, and being about six inches in diameter and one-fourth of an inch in thickness. Each pot, after receiving its quantity of acetic acid of the proper strength, is filled with the buckles R, the lower one of which rests on the projections $o$. Rows of pots thus charged are then put closely together on the lower perforated shelf L. Second and third rows may in like manner be put upon the first rows. In the same way the other shelves are to be packed with charged pots until the whole stack is filled to the number of several thousands of pots. This being done, the stack is closed, and live steam let in by pipe S from a boiler until thermometers G show that the stack and its contents have been brought to a proper temperature, about 100° Fahrenheit. At the same time I am making carbonic-acid gas by furnace and fuel, or otherwise. One good way, and which I use, is to have a suitable furnace, C, having a damper on the top of the chimney. Upon the grate of this furnace I make a coke fire. When the carbonic-acid gas is copiously produced the damper is closed, and the gas, by means of pump D, (of any suitable construction,) is withdrawn through earthen pipe Y, and forced through earthen pipe Z down into the washer B, and issues from the pipe into the water about six inches from the bottom of the washer. The washer may be made of a strong closed wooden tub, about eight feet high and about six feet in diameter. The tub is about half filled with water, which may or may not have a few pounds of sal soda or other suitable salt in solution. At the same time steam from the boiler E passes through the pipe F down into the water in the washer, issues near the bottom, and is regulated so that the thermometer G in the side of the washer indicates a regular internal temperature of about 100° Fahrenheit. As the carbonic-acid gas thus purified and heated to the desired temperature passes up through the water into the upper part of the washer it escapes through earthen pipe T into the stack just below the first shelf of pots. The heated carbonic-acid gas thus purified, and flowing into the stack which has been properly heated by steam let into it, co-operates with the fumes of acetic acid in corroding the metallic lead in a prompt and satisfactory manner.

Having fully described my invention, what I claim as new, and desire to secure by Letters Patent, is—

The process of making carbonate of lead by passing carbonic-acid gas through heated water or a heated solution into a properly-heated stack containing pots charged with acetic acid and metallic lead, substantially as described.

In testimony that I claim the above-described process for making white lead I have hereunto signed my name this 28th day of June, 1871.

CHAS. L. WHEELER.

Witnesses:
  JO. C. CLAYTON,
  F. C. BOWEN. (107)